H. Y. CAHILL.
VENTILATORS FOR GRAIN.
No. 190,955. Patented May 22, 1877.
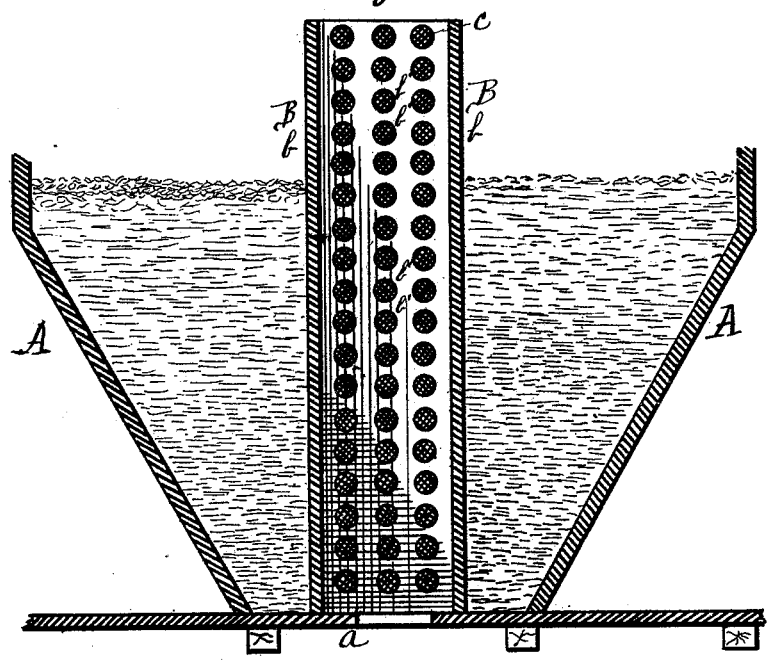

UNITED STATES PATENT OFFICE.

HENRY Y. CAHILL, OF DAYTON, OHIO, ASSIGNOR OF ONE-HALF HIS RIGHT TO WOLF A. WEINREICH, OF SAME PLACE.

IMPROVEMENT IN VENTILATORS FOR GRAIN.

Specification forming part of Letters Patent No. 190,955, dated May 22, 1877; application filed November 24, 1876.

*To all whom it may concern:*

Be it known that I, HENRY Y. CAHILL, of Dayton, in the county of Montgomery and State of Ohio, have invented certain new and useful Improvements in Ventilators for Grain; and I do hereby declare the following to be a full, clear, and exact description of the same.

It is well known that grain stored in bins often takes fire, and is destroyed by spontaneous combustion, owing to the accumulated moisture from a damp atmosphere, or from having been exposed to rains and stored away while damp. It is found, too, that this moisture penetrates to the center of the pile, where heat is generated. At first this causes mold, and, finally, if unchecked, will occasion the destruction of the whole.

My invention has for its object the prevention of such decay and destruction by providing an improved ventilating apparatus.

I accomplish my purpose by means of a perforated flue, open at the top and bottom, and covered with wire-gauze, and set vertically in a grain-bin, and over an opening in the bottom thereof, and acting as a conduit to carry off the warm vapor from the mass, and to introduce dry pure air, as will be herewith set forth and specifically claimed.

To enable others skilled in the art to which my invention belongs to make and use the same, I would thus proceed to describe it, referring throughout to the accompanying drawing, in which—

Figure 1 represents a central section in elevation through the portion of a grain-bin, showing the application and nature of my device.

My purpose is to devise a ventilator that a farmer of ordinary intelligence and capacity may construct for himself, in the following manner:

Four boards, $b$, of suitable length, are perforated with auger-holes $b'$, as represented, and are then joined together at the edges by nails or screws to form a hollow post, B. This conduit should be covered with wire-gauze $c$, as shown in Fig. 1, to prevent the falling of grain through the openings into the conduit. When thus constructed it is secured, in any convenient manner, to the bottom of the bin A at its center, where an aperture, $a$, is made to admit a free circulation of air through the conduit, said flue being extended above the top of the bin.

A pipe may be connected to the top of the conduit to carry off the air and vapor to any desired point outside the building.

While describing the above as the simplest form of construction for the conduit, I do not wish to limit myself to it alone, as a perforated iron conduit, covered with wire-gauze, would answer equally well.

I am aware that it is not new to ventilate grain by means of perforated conduits, and therefore lay no claim to such principle; but,

Having thus fully described my invention, what I claim as new is as follows:

The combination of the grain-bin A, having an aperture, $a$, in the bottom thereof, and a vertical perforated flue, B, extending above the top of the bin, covered with wire-gauze $c$, open at its top and bottom, and arranged over the aperture in the bottom of the bin, said flue acting as a conduit to carry off the warm vapor from the mass of grain, and introduce dry and pure air therein, substantially as and for the purpose specified.

Witness my hand this 4th day of November, A. D. 1876.

HENRY Y. CAHILL.

Witnesses:
CHAS. M. PECK,
WM. RITCHIE.